Aug. 26, 1930.  W. F. BOUCHÉ  1,774,167
AXLE PULLEY
Filed Aug. 15, 1927

Inventor
William F. Bouché
By
Attorney

Patented Aug. 26, 1930

1,774,167

UNITED STATES PATENT OFFICE

WILLIAM F. BOUCHÉ, OF ROCHESTER, NEW YORK, ASSIGNOR, BY MESNE ASSIGNMENTS, TO SIMPLEX EQUIPMENT COMPANY, INC., OF NEW YORK, N. Y., A CORPORATION OF DELAWARE

AXLE PULLEY

Application filed August 15, 1927. Serial No. 213,143.

The invention relates to pulleys and has special reference to a pulley particularly well adapted for but not necessarily restricted to use in connection with car lighting equipment, the pulley being applied to the car axle for the purpose of driving a generator.

It is of course well known that in car lighting apparatus there is provided a generator suitably mounted beneath a car and driven, usually, by a belt engaged about a pulley carried by the car axle so as to obtain the driving power. A pulley to be used in this capacity is preferably formed of sections so as to be engaged upon the axle without disturbing its mounting in the truck.

The present invention has for a more specific object the provision of an axle pulley formed from sheet metal and of such construction as to be readily mounted upon the axle.

A still more specific object of the invention is to provide a pulley for the above described or any other purpose formed of counterpart members which may be struck out by the employment of a single die and which are adapted to be assembled and secured permanetly with respect to one another, the invention further contemplating a very simple means for securing the sections in assembled relation in operative position upon a car axle.

An additional object is to provide a pulley of this character which will be extremely simple and inexpensive to manufacture, easy to install, rugged and durable in service, and a general improvement in the art.

Figure 1:
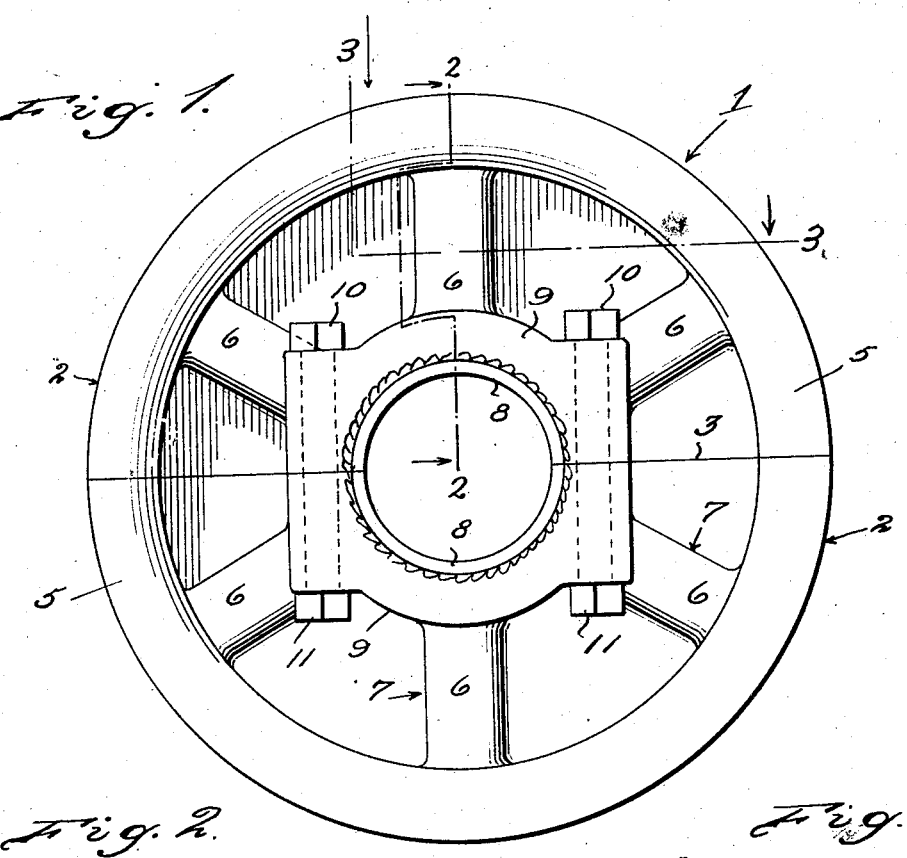
Figure 2:
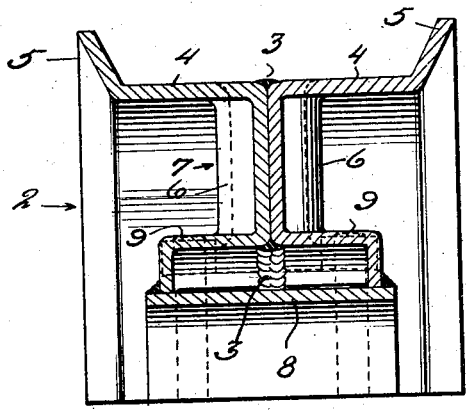
Figure 3:
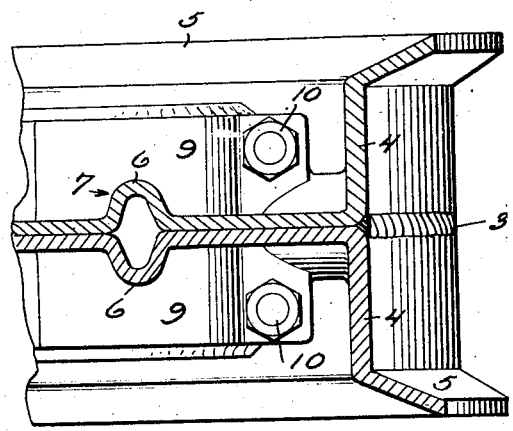

To the attainment of the foregoing and other objects and advantages, the invention preferably consists in the details of construction and the arrangement and combination of parts to be hereinafter more fully described and claimed, and illustrated in the accompanying drawing in which:

Figure 1 is a side elevation of a pulley constructed in accordance with the invention, Figure 2 is a detail section taken on the line 2—2 of Figure 1, and Figure 3 is a detail section taken on the line 3—3 of Figure 1.

Referring more particularly to the drawing, I have shown the pulley, indicated generally by the numeral 1, as formed from a plurality of counterpart elements 2 assembled in a manner to be described and formed very conveniently as by stamping or pressing them from sheet steel or other metal of suitable gauge or thickness. Each of these elements 2 is disclosed as semicircular in shape when viewed from the side and of dished form. In order that the pulley may be installed upon a car axle without disturbing the mounting of the axle in the truck, the pulley is formed in sections detachably connected, each section including two of the members or elements 2 arranged back to back and welded, brazed, soldered or otherwise suitably joined. Welding is preferable and the line of the weld is indicated in the drawing by the numeral 3. Each element or member 2 is shown as having its major portion flat or plane with a laterally extending flange portion 4 terminating in an outstanding retaining flange 5 which cooperates with the edges of the belt, not shown, to prevent the same from slipping off. Between the center and the lateral flange 4 each element is formed with a plurality of stamped out ribs 6, those on one section mating with corresponding ones on the adjacent section to define spokes 7 which add materially to the strength and rigidity of the structure.

The members 2 of each half of the pulley are welded or otherwise suitably secured, welding being preferable, to semicylindrical sleeve members 8 which mate to form a bushing or bearing for close engagement upon the axle.

It is of course conceivable that the two finished sections of the pulley might be secured together upon the axle in different ways but probably the most satisfactory plan is to form the members 2 with laterally extending portions 9 which extend in opposite directions when the pan members are assembled, these portions being suitably apertured for the passage of bolts 10 which operate to clamp the two sections of the pulley together, these bolts carrying nuts 11.

It is a possibility that any suitable face plate or ring could be provided to cover the hub portion defined by the mating semicylindrical sleeve members 8 and the adjacent portions of the members 2 but such modifications or additions are not illustrated inasmuch as they would constitute mere refinements and not essential features.

In the actual construction, it will be seen that there are four identically formed members secured together in pairs, each pair forming one-half of the pulley. When it is desired to install the device it is obvious that the two sections or halves may be readily engaged upon a car axle, the bolts 10 inserted through the proper apertures in the portions 9, and the nuts 11 applied and screwed home. After such mounting it will be seen, in view of the foregoing, that the pulley will be rigid and immovable with respect to the axle so that as the axle turns during the travel of the car whatever belt is engaged about the pulley will be driven to operate the generator. In case it is ever necessary the pulley may be just as readily demounted.

From the foregoing description and a study of the drawing it will be apparent that I have thus provided a thoroughly efficient and easily installed pulley for the purpose specified and one which may be produced at probably the minimum cost. The construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In driving pulley construction, in combination, a pulley comprising two substantially semicircular sections, each section being made up of two sheet metal stampings having portions arranged in back to back relation, parts of said portions being pressed away from each other and extending substantially radially to form spoke-like reinforcements, the peripheral portion of each stamping being bent substantially at right angles and then flanged to provide a belt-engaging surface, and said flange acting to prevent the belt from running off the pulley, and the inner peripheral portions of the stamping being pressed outwardly and then bent in a radial direction thereby to form a hub, and means for clamping said sections together and about a shaft.

2. In driving pulley construction, in combination, a pulley comprising a plurality of sectors, each sector being made up of two sheet metal members having portions extending radially, said portions being secured together and arranged back to back, said portions having parts thereof pressed out of their plane and extending in a substantially radial direction, each of said portions having an outer rim with which a belt may contact, said rim being bent substantially at right angles to said portions, means at the inner edges of said portions adapted to form part of a hub, and means securing said sectors together.

3. In driving pulley construction, in combination, a pulley comprising a plurality of sectors, each sector being made up of two sheet metal members having portions extending radially, said portions being secured together and arranged back to back, said portions having parts thereof pressed out of their plane and extending in a substantially radial direction, each of said portions having an outer rim with which a belt may contact, said rim being bent substantially at right angles to said portions, means at the inner edges of said portions adapted to form part of a hub, and means coacting with said hub parts for clamping said sectors together and about a shaft.

4. In driving pulley construction, in combination, a pulley comprising a plurality of sectors, each sector being made up of two sheet metal members having portions extending radially, said portions being secured together and arranged back to back, said portions having parts thereof pressed out of their plane and in a direction away from each other, said outwardly pressed parts extending substantially radially and the outwardly pressed part of one portion being substantially alined with the outwardly pressed part of another portion, each of said portions having an outer rim with which a belt may contact, said rim being bent substantially at right angles to said portions, means at the inner edges of said portions adapted to form part of a hub, and means coacting with said hub parts for clamping said sectors together and about a shaft.

In testimony whereof I affix my signature.

WILLIAM F. BOUCHÉ.